Figure 1:
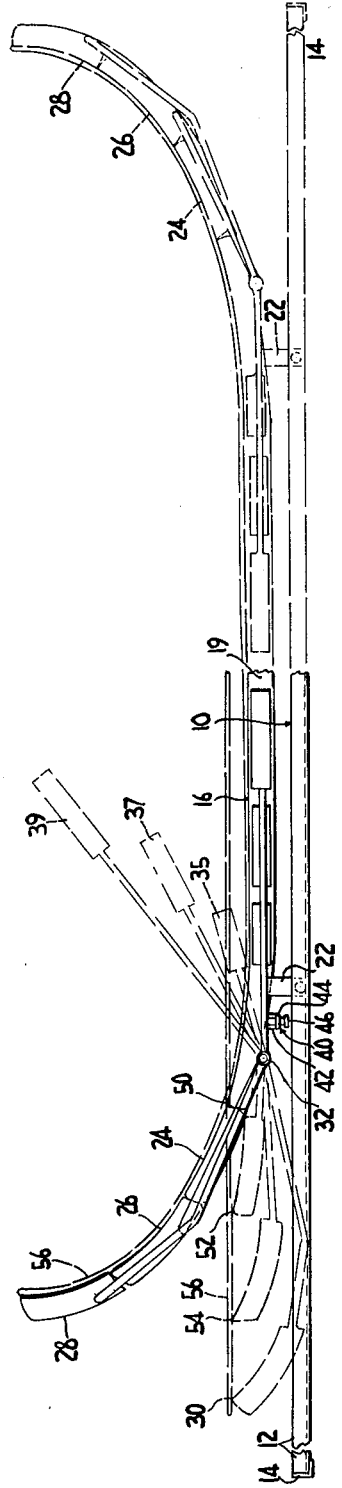

Feb. 8, 1966  H. E. McKELVEY  3,233,998
GLASS SHEET BENDING MOLD
Original Filed March 18, 1958

INVENTOR.
HAROLD E. McKELVEY
BY Oscar L. Spencer
ATTORNEY

United States Patent Office 3,233,998
Patented Feb. 8, 1966

3,233,998
GLASS SHEET BENDING MOLD
Harold E. McKelvey, New Kensington, Pa., assignor to Pittsburgh Plate Glass Company, Pittsburgh, Pa., a corporation of Pennsylvania
Original application Mar. 18, 1958, Ser. No. 722,199, now Patent No. 3,146,084, dated Aug. 25, 1964. Divided and this application Nov. 29, 1961, Ser. No. 155,693
6 Claims. (Cl. 65—291)

This application is a division of application Serial No. 722,199, filed March 18, 1958, now U.S. Patent 3,146,-084, granted Aug. 25, 1964, for Treating Glass Sheets.

This application relates to treating glass sheets and specifically refers to improved bending molds of the female skeleton type designed especially for bending glass sheets to non-uniform curvatures. The molds described herein impart a comparatively shallow bend centrally of the glass sheets. The shallow bend merges into intermediate portions where the radius of curvature of the bands diminishes rapidly. The extremities of the glass are bent to such a degree that the tangent to the surface of the bent glass is rotated on the order of 90 degrees from the tangent to the center of the glass.

Glass bending molds for bending flat glass sheets have been developed. Such molds comprise a center section and spaced wing sections flanking either longitudinal extremity of the center section. Each wing section is pivotable about an axis to a spread position to support a flat sheet of glass spanning the mold and rotatable into a closed position providing a continuous skeletonized surface having the desired contour of the bent glass. In such molds, the wing sections are normally urged into their closed mold position. Such molds were initially developed for bending relatively small sheets of glass into comparatively shallow cylindrical curves. Today, the requirements of automobile manufacturers demand larger sheets of glass shaped to very complex bends. These additional requirements bring out certain latent deficiencies in bending molds of the type previously acceptable for simple cylindrical bends.

According to the prior art, glass sheets are bent by heating them while supported in compression between stop members located at the extremities of the wing sections of the mold. The glass sheets while cold are rigid and behave as struts to maintain the stop members in the spread mold positions. When heat is applied to the glass, the glass softens, and its resistance to the mold closing lessens. The mold sections move to the closed mold position. The heat-softened glass moves to conform to the continuous skeleton structure resulting from closing the mold by a combination of heat sagging and mechanical force applied to the glass sheet extremities by the stop members. The entire glass sheet is slid into alignment with the closing mold.

Unless both ends of the flat glass sheets sag and slide equally during the bending operation, the sheet may get out of alignment with the mold. In cases where it is desired to bend small glass sheets into cylindrical curves, any misalignment due to unequal sagging or unequal sliding, or both, does not affect the curvature of the finished product materially. However, when bending to complex curvature is desired, any misalignment of the glass due to non-uniform sliding of the glass on the mold as the mold moves from open to closed position results in the formation of undesired curvatures in the glass due to the difference in size of the extremities of the misaligned glass. This error in curvature is magnified with larger sheets and more complex curvatures. Furthermore, another drawback of the type of mold which compresses a flat glass sheet at its extremities is what it is difficult to impress a non-uniform shape on the glass sheet.

In French Patent No. 1,089,973, various bending molds are disclosed. These bending molds comprising molding members of concave elevation including a central molding member fixed in position relative to a supporting frame and flanking molding members pivotable into a spread position where their longitudinal extremities are aligned with those of the fixed central molding member and cooperate to help support a flat glass sheet for bending. In bending glass sheets such molds utilize the principle of permitting the central portion of the glass sheet to sag and lifting the glass sheet extremities on the flanking sections of the mold to thereby impress the upper shaping surfaces of the flanking mold sections on the upwardly lifted heat-softened glass sheet extremities.

This reference also discloses a five-member mold in which the inboard and outboard extremities of all the movable mold members provide support for a flat glass sheet to be bent in conjunction with the longitudinal extremities of the central mold sections. Such construction fails to produce bending curves conforming exactly to the shape desired because different bending moments are required at the inboard and outboard extremities of each flanking mold section. At best, the net upward lifting forces applied to each flanking mold member represents a compromise between that required at its inboard extremity and that required at its outboard extremity.

The principle of resting a flat glass sheet as a beam on a spread, sectionalized mold and utilizing the combination of lifting the flanking portions of the glass sheet in coordination with the heat sagging of the central portion of the glass sheet is utilized in a more efficient manner by the present invention to provide a complex longitudinal bend to the glass. The present application utilizes a sectionalized bending mold comprising at least five molding members, each member provided with an upper shaping surface of concave elevation conforming to the shape desired for a different portion of the bent glass sheet, said members including a central molding member fixed in position relative to said support structure and flanking molding members rotatable relative to said central molding member into a closed mold position to provide a substantially continuous shaping surface conforming to the shape desired for the bent glass sheet.

Each flanking molding member is so constructed and arranged that its longitudinal outboard extremity only is aligned with the longitudinal outboard extremities only of the other molding members in a plane above the remainder of their upper shaping surfaces in a spread mold position to support a flat glass sheet for bending. Each flanking molding member has means providing a net rotational force operatively associated therewith, each of the last named means being so constructed and arranged to cause each flanking molding member to lift a portion of the heat-softened glass sheet in a predetermined manner.

The latter means constitute moment arms and counterweights, the construction of which is so chosen to provide localized control for the upward folding of each portion of a glass sheet to be bent to a complex bend. The net upward lifting force chosen for each molding member can be the exact force needed for the increment of glass outboard of the next inboard flat glass support rather than a compromise between that required at the inboard support and that required at the outboard support. The number of flanking mold members used depends on the complexity of the bend and how rapidly the bend changes from increment to increment along the length of the sheet. To facilitate construction, the flanking molding members are arranged in sets flanking each longitudinal extremity of the central molding member and a common pivot axis is provided for each set of flanking molding members and their associated lever arms.

The invention will be understood more clearly after studying the following description of a particular embodiment of the present invention, of which the accompanying drawings form a part.

Figure 2:
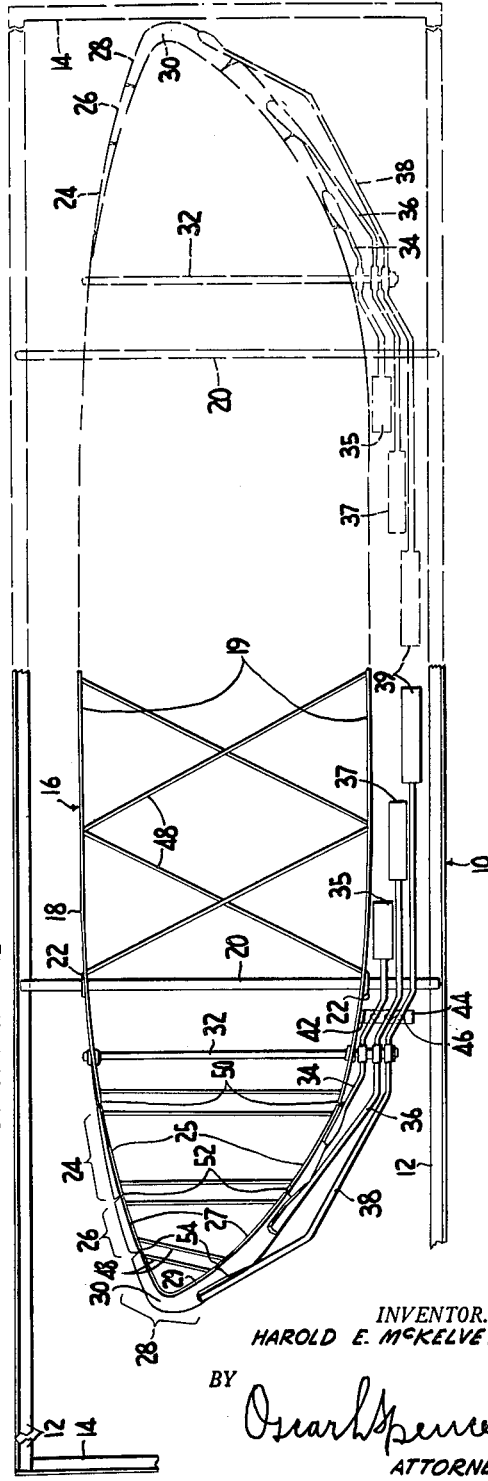

With reference to the drawings, wherein like reference numbers are applied to like structural elements, FIG. 1 is a longitudinal elevational view of a bending mold constructed according to the present invention in its closed mold position, with half the mold shown in phantom and including a phantom depiction of half the mold in its open position supporting a flat sheet of glass; and FIG. 2 is a plan view of the mold seen in FIG. 1 in its closed mold position.

A typical embodiment of the present invention includes a support structure, shown generally by reference number 10, which constitutes spaced longitudinal angle irons 12 interconnected by spaced transverse angle irons 14. The latter are supported on rolls of a conveyor (not shown) for transporting the mold and a supported glass sheet laterally for bending through a tunnel-like bending lehr in accordance with a technique well known in the glass bending art.

A glass bending mold 16 is supported on the support structure 10. The mold includes a central molding member 18 comprising a pair of spaced, longitudinally extending rails 19 each provided with an upper shaping surface of concave elevation conforming to the shape desired for the central portion of the bent glass sheet. Cross bars 20 interconnect the spaced rails 19 through uprights 22.

Flanking the longitudinal extremities of the central molding member 18 are flanking molding members 24 each provided with laterally spaced, rigidly interconnected longitudinally extending rails 25 which have an upper shaping surface of concave elevation conforming to the shape desired for the flanking portions of the bent glass sheet immediately outboard of the center portion. Additional flanking molding members 26 comprising laterally spaced rigidly interconnected longitudinally extending rails 27, each having an upper shaping surface of concave elevation conforming to the shape desired for the portions of the bent glass sheet immediately outboard of the portions previously described are located immediately outboard of the flanking molding members 24. An additional flanking molding member or endmost molding member 28 comprising a reversely curved rail having a pointed extremity 30 offset with respect to the longitudinal center line of the mold and having an upper shaping surface conforming to that of the longitudinal extremities of the glass sheet is located outboard of flanking molding members 24 and 26.

The flanking molding members 24, 26 and endmost molding members 28 are arranged in sets on either side of the longitudinal extremities of the central molding member 18. The flanking and endmost molding members of each set may be pivoted about a common pivot axis provided by a transverse rod 32. In order to pivot each flanking molding member about the common pivot axis, flanking molding member 24 is provided with a crooked moment arm 34 having a counterweight 35 at its inboard extremity, flanking molding member 26 is provided with a crooked moment arm 36 having a counterweight 37 at its inboard extremity and endmost molding member 28 is provided with a crooked moment arm 38 having a counterweight 39 at its inboard extremity. Each of the crooked moment arms 34, 36 and 38 makes bearing contact with the transverse pivot rod 32 longitudinally inward of the longitudinally inner extremity of its attached molding member 24, 26 and 28, respectively.

A stop member 40 constructed of a downwardly depending flange 42 and a horizontally extending apertured flange 44 and a series of set screws 46 serves as stop members for preventing excessive rotation of each of the crooked moment arms 34, 36 and 38, thus limiting the rotation of the flanking molding members 24 and 26 and endmost molding members 28 to positions wherein the molding members 18, 24, 26 and 28 provide through their rails a substantially continuous upper shaping surface conforming in elevation and outline to the ultimate shape desired for the bent glass sheet.

Each of the molding members is given structural rigidity by means of transversely extending bracing members 48 interconnecting opposing rails 19, 25, 27 and the converging portions 29 of the endmost mold sections 28.

Reference number 50 refers to the longitudinal outboard extremities of the central molding member rails 19, reference number 52 refers to the longitudinal outboard extremities of the flanking molding member rails 25 and reference number 54 refers to the longitudinal outboard extremities of the flanking molding member rails 27. As seen in the phantom portion of FIGURE 1, when a flat glass sheet 56 is mounted for bending on a sectionalized bending mold, it is supported at the longitudinal outboard extremities 50 of the rails 19, the longitudinal outboard extremities 52 of the rails 25, the longitudinal outboard extremities 54 of the rails 27 and the converging portions 29 of the endmost mold members 28 at the pointed extremities 30 of the mold.

As the glass sheet is conveyed while mounted on the mold through a bending lehr where the glass temperatures increase to the softening point, the glass sheet, which had sufficient mass in its flat, rigid condition to counterbalance the exclusive net force provided by the counterweights 35, 37, and 39 to tend to lift the flanking molding members 24 and 26 and endmost mold members 28, respectively, begins to soften. As the glass sheet softens, a net upward lifting force is provided through the outboard longitudinal extremities 52 of rails 25, longitudinal extremities 54 of rails 27 and the pointed extremity 30 of the reversely curved rail. Therefore, the softened glass sheets are lifted in the regions requiring severe bending at a plurality of spaced thrust points, the number and spacing of the points being dependent upon the severity of the bending in the localized portions to be bent.

The relative masses of the counterweights 35, 37, and 39 and the relative lengths of the crooked moment arms 34, 36, and 38 are so chosen as to cause the different portions of the glass sheet to be lifted about the common pivot axes 32 at such rates relative to each other that each portion of the sheet follows a time cycle for bending that fits into the pattern for the entire sheet to cause each portion of the entire sheet to reach its final curved contour substantially simultaneously.

While a mold provided with seven molding members has been depicted, it is readily understood that the number of molding members may be increased or decreased depending upon the severity of bend and the rate of change of radius of curvature in various localized portions of the glass sheet bend. For complex bends, the present invention requires a minimum of five molding sections comprising a central molding member plus two sets of two flanking molding members each with each flanking molding member actuated by a separate means providing an independent and exclusive net rotational force to lift each flanking molding member at a rate necessary for lifting the localized portion of the glass sheet supported outwardly of the next inboard molding member. Since all the molding members are concave in elevation, the flat glass sheet is supported at a series of spaced supports located at the outboard extremities of the molding members and above the remainder of the mold shaping surface. Upward lifting forces are applied simultaneously to the glass through the plurality of supports. Proper choice of the lifting force to be applied to each increment of glass is simplified because it is not necessary to compensate for the effect of lifting the glass by the inboard extremity of each mold member as in the prior art. The upward lifting force applied through each mold member is independent and exclusive of those applied through each other mold member. Therefore, any complicated pattern can be facilitated by proper choice of net upward lifting forces to apply to each longitudinal increment of the glass sheet. When the bends are complicated, the lifting force applied to one increment on either side of the center of the sheet differs from that applied to another increment on the same side of the center of the sheet.

While a particular embodiment of the present invention has been disclosed, it is understood that various changes may be made in the light of the present disclosure without departing from the spirit of the present invention. For example, each of the flanking and endmost molding members may be made rotatable about a separate axis of rotation provided each of the movable molding members supports the flat glass sheet at its outboard extremity only. Thus, a plurality of independent and mutually exclusive localized lifting thrusts are applied simultaneously to localized portions of the heat-softened glass sheet to facilitate its bending to very complex curvatures.

What is claimed is:

1. Apparatus for bending a glass sheet comprising
a mold support structure,
a sectionalized bending mold mounted on said support structure,
said bending mold being composed of molding members including a central molding member fixed in position relative to said support structure and flanking molding members pivotally mounted relative to the fixed central molding member about fixed axes of rotation between an open mold position and a closed mold position,
said flanking molding members comprising a pair of end molding members and at least one intermediate molding member disposed between each of said end molding members and said central molding member, each intermediate molding member comprising a pair of laterally spaced interconnected shaping rails, each molding member having a different portion of a shaping surface of concave elevation formed thereon, whereby
in the open mold position, the longitudinal outboard extremities only of each of the flanking molding members are aligned in a horizontal plane above the remainder of their upper shaping surfaces to provide spaced supports for portions of a flat glass sheet mounted thereon for bending, and
in the closed mold position, said flanking molding members cooperate with said central molding member to form a substantially continuous shaping surface conforming to the shape desired for the bent glass sheet,
and independent and mutually exclusive means operatively connected with each flanking molding member to provide an exclusive rotational force to independently lift each flanking molding member from said open mold position to said closed mold position, thereby lifting a portion of a heat softened glass sheet independently of the lifting of any other portion of said heat softened glass sheet.

2. Apparatus for bending glass sheets comprising a central molding member having an upper shaping surface of concave elevation with longitudinal extremities disposed in a common plane;
at least two flanking molding members, including an end molding member and at least one intermediate molding member pivoted about a fixed axis of rotation between a spread mold position and a closed mold position, and located beyond each longitudinal extremity of said central molding member,
each said flanking molding member having inner and outer longitudinal extremities and an upper shaping surface of concave elevation extending downward and longitudinally inward from its outer longitudinal extremity, said intermediate molding members comprising interconnected spaced shaping rails;
whereby said flanking molding members, when pivoted relative to said central molding member into a spread mold position, are disposed so that the outer longitudinal extremities occupy positions along the common plane occupied by the longitudinal extremities of the central molding member to provide spaced supports for portions of flat glass sheets mounted on the molding members for bending and the inner longitudinal extremities of said flanking molding members are below said common plane and in spaced relation to the molding member longitudinally inward thereof,
said flanking molding members when pivoted to said closed mold position, are arranged in end-to-end relation with adjacent molding members to provide a substantially continuous upper shaping surface conforming to the shape desired for the glass sheets after bending;
and means to move each of said flanking molding members independently and exclusively between said spread mold position and said closed mold position.

3. Apparatus for bending a glass sheet comprising
a mold support structure,
a sectionalized, skeletonized bending mold mounted on said support structure and including
a central molding member fixed in position relative to said support structure and having longitudinal extremities disposed in a common horizontal plane,
sets of flanking molding members located beyond each longitudinal extremity of said central molding member, each said flanking molding member having inner and outer longitudinal extremities and concave shaping surfaces extending downward and longitudinally inward from its outer longitudinal extremity, each said set of flanking molding members comprising an end molding member and at least one intermediate molding member disposed between said end molding member and said central molding member, each said intermediate molding member comprising a pair of spaced, interconnected shaping rails,
a common pivot means for each set of flanking molding members located longitudinally inward of the inner longitudinal extremity of each said flanking molding member and fixed relative to said support structure, said pivot means providing a bearing for rotating each said flanking molding member relative to said central molding member between a spread mold position and a closed mold position,
individual moment arms having inboard and outboard extremities, each said moment arm being fixed at its outboard extremity to one of said flanking molding members and making bearing contact intermediate its extremities with its corresponding pivot means and having a counterweight attached to its inboard extremity,
said flanking molding members, when pivoted relative to said central molding member into a spread mold position, are disposed so that the outer longitudinal extremities occupy positions along the common plane occupied by the longitudinal extremities of the central molding member to provide spaced supports for portions of flat glass sheets mounted on the molding members for bending and the inner longitudinal extremities of said flanking molding members are below said common plane and in spaced relation to the molding member longitudinally inward thereof,
and said flanking molding members, when pivoted to said closed mold position, are arranged in end-to-end relation with adjacent molding members to provide a substantially continuous upper shaping surface conforming to the shape desired for the glass sheet after bending.

4. Apparatus as in claim 1, wherein said flanking molding members are arranged in sets flanking each longitudinal extremity of the central molding member and a common pivot axis is provided for each set of flanking molding members.

5. Apparatus as in claim 2,
wherein said pivot means comprises a common pivot means for pivoting the flanking molding members that are located longitudinally outwardly of one longitudinal extremity of said central molding member and
another common pivot means for pivoting the flanking molding members that are located longitudinally outwardly of the other longitudinal extremity of said central molding member.

6. Apparatus as in claim 5,
wherein each said common pivot means is located longitudinally inward of the inner longitudinal extremity of each said flanking molding member,
and moment arm means having an inner end and an outer end is connected adjacent its outer end to each of said flanking molding members and
pivotally connected to one of said common pivot means intermediate its outer end and its inner end and
weight means is attached to said moment arm means adjacent its inner end.

References Cited by the Examiner

FOREIGN PATENTS

| | | |
|---|---|---|
| 201,257 | 3/1956 | Australia. |
| 1,089,973 | 10/1954 | France. |
| 770,131 | 3/1957 | Great Britain. |

DONALL H. SYLVESTER, *Primary Examiner.*